United States Patent [19]

Mowery, Jr.

[11] Patent Number: 5,246,505

[45] Date of Patent: Sep. 21, 1993

[54] SYSTEM AND METHOD TO IMPROVE THE POWER OUTPUT AND LONGETIVITY OF A RADIOISOTOPE THERMOELECTRIC GENERATOR

[75] Inventor: Alfred L. Mowery, Jr., Potomac, Md.

[73] Assignee: The United States of America as represented by the United States Department of Energy, Washington, D.C.

[21] Appl. No.: 870,856

[22] Filed: Apr. 20, 1992

[51] Int. Cl.⁵ ............................................. H01L 37/00
[52] U.S. Cl. ..................................... 136/202; 136/201; 136/205; 376/320; 376/321
[58] Field of Search ............... 136/200, 201, 202, 205; 376/320, 321

[56] References Cited

U.S. PATENT DOCUMENTS

| | | | |
|---|---|---|---|
| 3,615,869 | 10/1971 | Barker et al. | 136/202 |
| 3,633,033 | 1/1972 | Cottam | 250/106 S |
| 3,697,329 | 10/1972 | Bunker et al. | 136/202 |
| 5,057,160 | 10/1991 | Ward, III et al. | 136/202 |
| 5,111,099 | 5/1992 | Smith | 310/305 |

OTHER PUBLICATIONS

Schumann, Frederick A., "Fuel Capsule Vent System Development for the Viking Radioisotope Thermoelectric Generator", Sep. 1973, pp. 156-164 of Nuclear Technology.

Primary Examiner—Donald P. Walsh
Assistant Examiner—Chrisman D. Carroll
Attorney, Agent, or Firm—William R. Moser; Judson R. Hightower; Richard E. Constant

[57] ABSTRACT

By using the helium generated by the alpha emissions of a thermoelectric generator during space travel for cooling, the thermal degradation of the thermoelectric generator can be slowed. Slowing degradation allows missions to be longer with little additional expense or payload.

9 Claims, 1 Drawing Sheet

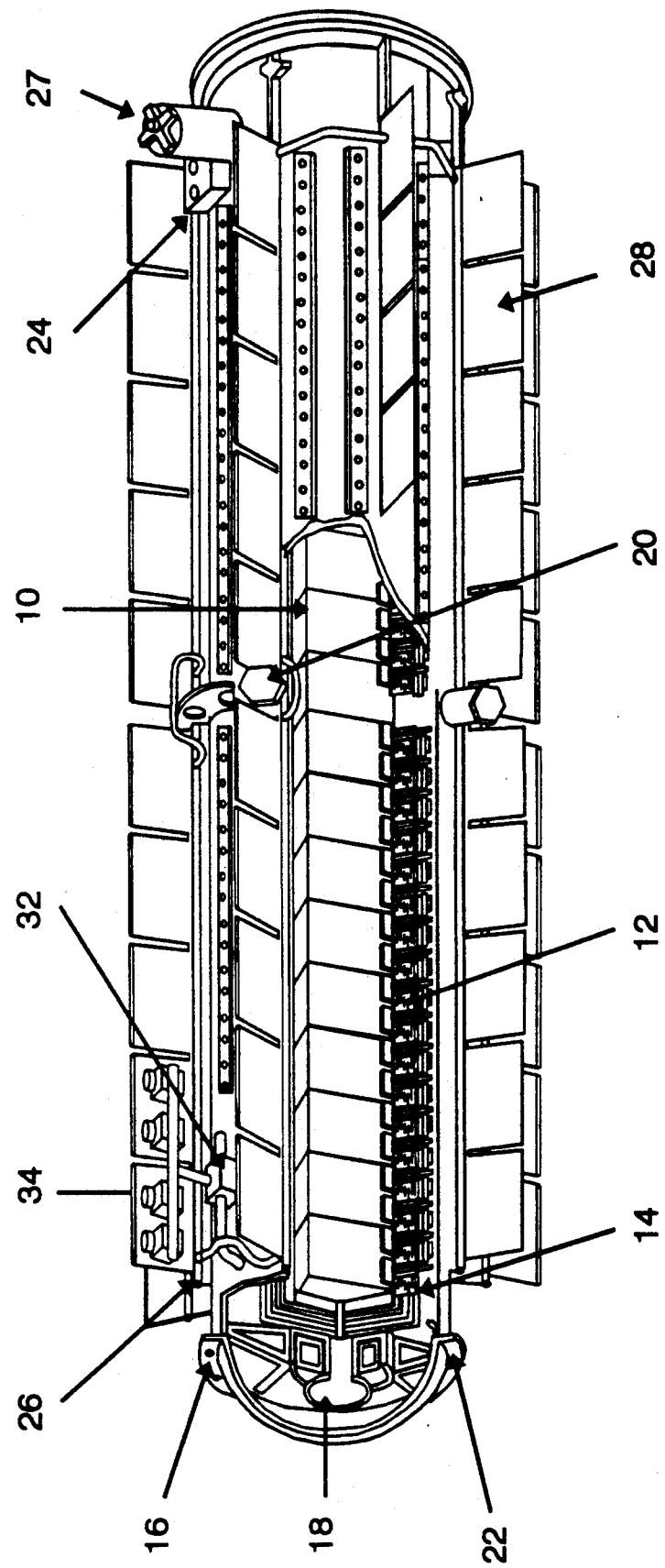

SYSTEM AND METHOD TO IMPROVE THE POWER OUTPUT AND LONGETIVITY OF A RADIOISOTOPE THERMOELECTRIC GENERATOR

This invention is owned by the Department of Energy.

FIELD OF THE INVENTION

The present invention relates generally to a system and a method of protecting radioisotope thermoelectric generators during periods where full power is not needed, more particularly, to protecting radioisotope thermoelectric generators by holding the helium that is generated by alpha decay and using it to enhance cooling within the generator, thereby extending the useful life of the generator.

BACKGROUND OF THE INVENTION

Spacecraft have used several sources of power to operate the payload since the beginning of the space program. In early spacecraft, which were small and had limited capability, batteries met modest power needs. As the complexity and the power needs of the payload grew, primary power was supplied by solar cells. Though solar cells are able to convert sunlight directly into electricity, they have major drawbacks. They have a low efficiency and therefore huge arrays are needed. Further, the power system still needs rechargeable batteries for periods when the spacecraft is in the shadow of the earth. Finally, solar arrays are impractical for distances greater than Mars. The insolation (light energy from the sun per square meter) drops off as the square of the distance from the sun. At Mars, solar power is less than half that received on earth. At Jupiter, it is reduced by a factor of 27, and Saturn, by a factor of 100.

For large power requirements, such as for the Apollo mission, fuel cells were employed. Fuel cells produce power by electrochemically producing the products of combustion. The chemical energy supplied by fuel cells also limits the distance spacecraft can travel because of limitations on the mass of chemicals that can be carried.

When the space programs' goals expanded beyond what chemical power and solar power could provide, NASA requested the Atomic Energy Commission (now the Department of Energy) to develop nuclear power sources. It was decided that the most reliable system would be to use the heat generated by radioactive decay to power thermoelectric devices.

Thermoelectric technology for power generation began in earnest in the late 1950's and a number of semiconducting materials were developed in the Space Nuclear Auxiliary Power (SNAP) program conducted by the AEC. Successful radioisotope thermoelectric generators (RTG) were deployed in the early 1960's to power navigation and weather satellites. The Viking program landed two RTG-containing spacecraft on the Martian surface. The first deep space probe, Pioneer, is powered by RTGs and is expected to operate with them as the only source of power for more than twenty-five years.

Thermoelectic devices are based on the principle discovered by Thomas Seebeck in 1822: when two different electrical conductors are connected in a closed circuit, they will produce electricity if one junction is kept at a higher temperature than the other. This is the phenomenon that allows thermocouples to measure temperature.

The material used for the thermoelectric elements of the RTG is typically a semiconductor material made of a silicon-germanium (SiGe) solution doped to improve its conductivity. This semiconductor material is fabricated into a rod-like thermoelectric device called a unicouple. It generates electricity when one end is hot and the other end is cold. The greater the temperature difference, the more power that is generated. The temperature difference is maintained by insulating the heat source and embedding the unicouples in the insulation so that one end projects from the inner surface of the insulation, adjacent to the heat source. The other end projects from the outer surface of the insulation and is kept cold by radiation into space. Appropriate circuitry collects and distributes the electricity generated.

As spacecraft and rocket launcher technology has grown, the need for higher RTG power output, lower weight, and longer operating times has also grown. One means of increasing power output is to increase operating temperature. However, high operating temperatures require the sealing of the thermoelectric elements to prevent their rapid degradation. Even with sealing, degradation is still a problem. It has been desirable to keep temperatures as high as possible once power is needed and as low as possible before power is needed.

The RTG is subject to two significant power degradation mechanisms. One is radioactive decay of the plutonium isotope that has a half-life of 88 years. This inevitable power loss is about 1% per year. The other mechanism is degradation of the unicouples. The electric power loss due to the unicouple degradation is also about 1% per year.

Before an RTG is put into use, it is stored with a cooling gas. The cooling gas is usually argon. The cooling gas provides conductive and convective heat transfer from the insulation and thermoelectric elements to the outer shell. The cooling seems to be sufficient to eliminate degradation of the thermoelectric elements because the only loss in power is that predicted from radioactive decay alone. With the argon cooling gas, the hot end of the thermoelectric element is about 725° C.

When an RTG is used in space and operating, the insulation is in a vacuum and heat transfer is by radiation to the outer shell and from the outer shell to space. The vacuum conditions begin when conditions in space activate a pressure relief device. The vacuum conditions are then used in the RTG throughout the mission.

At normal vacuum operating temperatures of 1000° C., there are two significant degradation processes that appear to be taking place. One, the unicouples gradually loose their efficiency through some kind of internal degradation. This is thought to be because of migration and precipitation of dopants. Two, the electrical resistance of the unicouple-insulation layer of the RTG drops because of vaporization and deposition of the semi-conducting materials on the surfaces of the insulation. This causes electrical shorting, which decreases overall efficiency of the RTG.

At operating temperatures that are used in space, these two degradation mechanisms account for about 1% power lost per year. However, at the lower storage temperatures of 725° C., neither unicouple efficiency nor electrical resistance changes. Operating in a vacuum and an inner temperature at about 1000° C. balances degradation and efficiency to permit the optimum power output for missions that take 10 years or more to accomplish. Temperatures of 1100° C. produce 25% more power initially, but after 5 years, would produce less power than a unicouple operating at 1000° C. for 10 years.

As the distance to be traveled has continued to increase, various technologies have been used to increase the range of spacecraft. The Galileo spacecraft was the first to use "gravity assists" from planets. In a gravity assist, the spacecraft flies close enough to a planet to accelerate relative to the Sun. In the case of Galileo, it was necessary to first fly by Venus and then return to Earth twice to gain enough velocity to reach Jupiter.

The gravity assist allows more payload for a given launch. But with the gravity assist, the length of time required to accomplish a given mission has increased greatly, as have the periods for which full power is not needed. During the coast period, much of the instrumentation is quiescent and draws no power. Because there is no means to cool the RTG in space, deterioration continues. Thus, if a mission is going to take more than 10 years, it would be desirable to control the operating temperature so that it could be elevated only when greater power was needed.

SUMMARY OF THE INVENTION

The present invention is a system for slowing the deterioration of the thermoelectric elements of a radioisotope thermoelectric generator (RTG) when full power is not needed. It is based on conventional RTG design. With this invention, helium that is produced by alpha decay is collected by or released from a gas management region, depending on power needs. The presence of helium increases heat transfer from the insulation to the outside walls, lowering the internal temperature and thereby slowing the degradation of the unicouples and extending their useful life. When full power is needed, the helium is released to space and high temperature vacuum operation is regained.

The invention comprises a radioactive, alpha-particle-emitting heat source forming a central core, insulation surrounding the heat source forming a generally annular shape, a plurality of thermoelectric elements embedded in the insulation for converting temperature differences into electricity, an outer shell, and a gas management assembly for releasing or retaining helium generated.

Helium release is controlled by valves that are arranged in series and parallel for extra reliability. Depending on the length of the mission and the temperatures needed, the fail-safe operation can be designed in two ways. One, the control system can be designed to fail with the valves open so that full power would be always be available. If the mission is very long or operating temperatures very high, the valves would be designed to fail in the closed position so that the RTG would not destroy itself before the mission was completed.

BRIEF DESCRIPTION OF THE DRAWINGS

FIG. 1 shows a cutaway drawing of a radioisotope thermonuclear generator.

DETAILED DESCRIPTION OF PREFERRED EMBODIMENTS

The use of the helium generated by alpha decay cool thermoelectric elements for periods when power demands are reduced was developed for the space program to extend the useful life of radioisotope thermoelectric generators. RTGs have been stored over 5 years with argon as the cooling gas. It appears that such storage prevents essentially all unicouple degradation, thus demonstrating the principles upon which this invention is based.

The system is illustrated in FIG. 1. A heat source 10 with a rod-like shape forms the core. It contains a radioactive substance, such as plutonium, whose decay generates alpha particles and heat. For the NASA program, the core is referred to as the General Purpose Heat Source (GPHS). It has 18 modules that contain over 130,000 Curies of the radioactive isotope $^{238}PuO_2$. The plutonium produces over 4400 watts of heat through radioactive decay while releasing alpha particles. (Alpha particles are the nucleus of helium). Initially, this alpha decay produces over 15 standard cubic centimeters of helium per day. This helium is currently vented from the generator once the spacecraft is in a vacuum and the rupture disk of a pressure relief valve has been punctured. With this invention, the rupture disk is not necessary and helium is retained or released as needed.

The converter that surrounds and supports the GPHS houses 512 semiconductor thermoelectric elements 12 (unicouples). The unicouples are connected in series and in parallel and are imbedded in a multi-foil, super-insulator 14 that consists of 70 layers of molybdenum foil separated by astroquartz (a fiberglass-like material). This insulation system forces over 90% of the heat generated by the GPHS through the thermoelectric elements to maximize the electricity generation efficiency (almost 7%).

There are several other elements indicated in FIG. 1. An outer shell assembly 16 is the main structure supporting the GPHS via the heat source supports 18. The mid-span heat source support 20 provides additional support to withstand launch dynamic environments. The outer shell also provides a mounting flange 22 to attach the RTG to the spacecraft. The cold end of the unicouples are attached to and protrude from the outer surface of the multi-foil insulation, a shell which supports the insulation system.

An Auxiliary Cooling System (ACS), consisting of the manifold 24 and the cooling tubes 26, provides a means of removing the heat during periods on the launch pad when the RTG is inside the payload fairing which protects the spacecraft during launch. Once the spacecraft is in space the cover gas can be vented by the gas management system. Heat transfer is by radiation into space via the outer shell 16 and its fins 28. In normal operation the converter remains in vacuum and produces the maximum available power throughout the mission.

The components new to the RTG with this invention are the Helium Pressure Control Valves 34 which replace a pressure relief device the evacuates the RTG once it is in the vacuum of outer space. In normal operation of the RTG, the cover gas could be vented any time after launch.

During the long periods of cruise, which have been exacerbated by the gravity assists, usually only about one-half the available RTG power is required. This cruise power is primarily used for spacecraft control and communications. Somewhat higher power levels are required as the science packages are activated during significant events. Full available power is only required when the primary objective of the mission is reached. In the Cassini mission this is Saturn encounter and orbital encounters with its various moons. Design of the spacecraft systems and initial RTG power requirements are typically dictated by end-of-mission power requirements.

The helium that is produced by alpha decay of the heat source plutonium is an inert gas. When helium is retained, it builds up pressure in the converter and acts as a storage cover gas; the power output would drop to about 50% of vacuum performance. Helium is an excellent heat conductor so that even a low internal pressure will bring the converter to storage-like conditions.

At the plutonium decay rate, about 15 scc of helium is produced per day. Given a converter internal void volume of about 25 liters (25,000 cubic centimeters), the pressure build up in the converter if the Gas Management System remained closed would be about 1 Torr per day (1 Torr=0.0013 atmospheres).

If the valves remained closed, power levels might drop below needed levels. In order to keep the RTG power level at or above a specified level, the valves would be opened periodically.

The valves would be designed to fail in the open position so that in case of malfunction, the RTG would revert to normal vacuum operation. These can be open/closed (digital) or needle (analog) valves. The valves would be controlled remotely to make the RTG produce any desired power level.

Another potentially significant feature of the invention is the potential in future missions of increasing the hot junction temperature to further improve the thermoelectric efficiency and gain additional performance for short periods. Propitious throttling back of the power during the cruise phase would reduce temperatures in the converter to a point where the failure mechanisms would not be a concern because the periods of full power would be so brief. Hot junction temperatures could be raised to the range of 1050 to 1100° C. This would raise the available power at primary encounter between 25 and 40% over that currently available, depending on the length of the mission and its power demands.

A different arrangement of the valving to control the RTG power would have to developed for higher hot junction temperature operation. Vacuum operation would not be a "fail-safe" condition because the RTG could rapidly loose power when operating at full power at high temperatures. For high performance operation (high hot junction temperature), a "quad-pack" valve arrangement would be employed. A quad-pack is two valves in parallel with a valve in series in each leg. This valving arrangement would maximize reliability of the gas management system while maintaining temperatures essential for reliable RTG operation.

A proof-of-principle experiment was performed on the Galileo Qualification RTG, Q-1, to partially verify the performance of the generator in a helium atmosphere. The data indicated that the Q-1 RTG responded as expected to a helium atmosphere generated by a live plutonium heat source. After 100 hours, power had decreased by 15%, after 400 hours, by 30%, and after 1000 hours, by nearly 40%. After 1025 hours, within several of hours of venting the helium, the generator was back at of full power.

It took a little over two months to reduce the power output to near 60% of initial power. Q-1 was an "experimental" RT configured for testing. The data showed that a substantial helium leak existed in the test configuration. If the generator is properly sealed as a typical flight RTG, the 50% cruise power level should be reached in less than a month.

What is claimed is:

1. A system for slowing the deterioration of a radioisotope thermoelectric generator (RTG) when power is not needed, comprising:
   a radioactive, alpha-particle-emitting heat source forming a central core;
   insulation surrounding said heat source forming a generally annular shape;
   a plurality of thermoelectric elements, embedded in said insulation so as to have a hot and a cool end, for converting temperature differences into electricity; an outer shell assembly surrounding said insulation; and
   a gas management assembly for releasing from or retaining within said outer shell helium generated by alpha decay of said radioactive heat source according to power needs, whereby the operating temperature of said thermoelectric elements is subject to control for alternatively raising the operating temperature when peak power is required and lowering the operating temperature to minimize degradation of said thermoelectric elements during low power demand periods.

2. The system of claim 1 wherein said plurality of thermoelectric elements are silicon-germanium unicouples.

3. The system of claim 1 wherein said gas management assembly comprises:
   two pressure control valves, said valves being controllable remotely and installed in parallel.

4. The system of claim 1 wherein said gas management assembly comprises:
   four pressure control valves that fail in the closed position, said valves being controllable remotely and installed in two serial pairs in parallel.

5. The system of claim 1 wherein said insulation forces more than 90% of the heat through said thermoelectric elements.

6. The system of claim 5 wherein said insulation comprises alternating layers of foil and insulating separators.

7. A method for reducing the temperature and prolonging longevity of a radioisotope thermoelectric generator when full power is not needed, comprising:
   using a radioisotope that generates alpha particles as a heat source;
   closing a remotely controlled valve assembly so that helium that is formed from the alpha particles can be collected in a gas management region;
   allowing helium to build up during periods when full power is not needed; and
   venting the helium when full power is needed.

8. The method of claim 7 wherein the building up of helium is caused by the closing of two remotely controlled normally-open valves operating in parallel.

9. The method of claim 7 wherein the valve assembly would fail in the open position so that helium would not be collected and the RTG would operate at full power.

* * * * *